United States Patent
Schmid et al.

(10) Patent No.: US 8,459,661 B2
(45) Date of Patent: Jun. 11, 2013

(54) WHEEL SUSPENSION FOR MOTOR VEHICLES

(75) Inventors: Wolfgang Schmid, Freising (DE);
Karl-Heinz Meitinger, Trostberg (DE);
Wilfried Michel, Riedenburg (DE);
Christoph Kossira, Ingolstadt (DE);
Hugo Mueller, Rohrenfels-Ballersdorf (DE)

(73) Assignee: Audi AG, Ingolstadt (DE)

(*) Notice: Subject to any disclaimer, the term of this patent is extended or adjusted under 35 U.S.C. 154(b) by 367 days.

(21) Appl. No.: 12/565,389

(22) Filed: Sep. 23, 2009

(65) Prior Publication Data

US 2010/0072714 A1    Mar. 25, 2010

(30) Foreign Application Priority Data

Sep. 23, 2008 (DE) .......................... 10 2008 048 569

(51) Int. Cl.
*B62D 17/00* (2006.01)
(52) U.S. Cl.
USPC ................ 280/5.52; 280/5.521; 280/86.751
(58) Field of Classification Search
USPC .......... 280/5.52, 5.521, 5.522, 86.75, 86.751, 280/86.758
See application file for complete search history.

(56) References Cited

U.S. PATENT DOCUMENTS

| 3,833,235 | A | * | 9/1974 | Worsham ..................... 280/89.1 |
| 2003/0011157 | A1 | * | 1/2003 | Aubarede et al. ........ 280/86.751 |
| 2005/0236797 | A1 | * | 10/2005 | Deal et al. ............. 280/124.135 |
| 2005/0280241 | A1 | * | 12/2005 | Bordini .................. 280/124.135 |
| 2007/0080513 | A1 | * | 4/2007 | Osterlanger et al. ..... 280/86.751 |
| 2009/0223322 | A1 | * | 9/2009 | Kossira et al. ................ 74/828 |
| 2010/0013176 | A1 | * | 1/2010 | Aramah et al. ............ 280/5.521 |
| 2010/0156057 | A1 | * | 6/2010 | Blondelet et al. ........... 280/5.52 |
| 2010/0253026 | A1 | * | 10/2010 | Michel et al. ........... 280/86.751 |
| 2010/0327543 | A1 | * | 12/2010 | Meitinger et al. ......... 280/5.521 |

FOREIGN PATENT DOCUMENTS

| DE | 39 28 135 A1 | 3/1990 |
| DE | 10 2004 049 296 A1 | 4/2006 |
| DE | 10 2005 025 039 A1 | 12/2006 |
| DE | 102008011367 | 4/2009 |
| EP | 2098386 A1 | 9/2009 |
| JP | 02099469 A | 4/1990 |
| WO | 8908566 A1 | 9/1989 |
| WO | WO 96/07557 | 3/1996 |
| WO | WO 98/16418 | 4/1998 |

* cited by examiner

*Primary Examiner* — Ruth Ilan
(74) *Attorney, Agent, or Firm* — Novak Druce Connolly Bove + Quigg LLP (57) ABSTRACT

The invention relates to a wheel suspension for motor vehicles, with at least one wheel-side support member which pivotally supports one vehicle wheel and at least one axle-side support member, between which at least one intermediate element is connected, in particular an actuator for setting the track angle and/or the camber angle ($\delta$, $\epsilon$) of the vehicle wheel. According to the invention the wheel-side support member and the axle-side support member are pressed into contact with one another by a pretensioning means with a pretensioning force ($F_V$).

21 Claims, 5 Drawing Sheets

WHEEL SUSPENSION FOR MOTOR VEHICLES

CROSS-REFERENCE TO RELATED APPLICATIONS

This application claims priority from German Patent Application No. 10 2008 048569.1 filed Sep. 23, 2008.

The invention relates to a wheel suspension for motor vehicles.

BACKGROUND OF THE INVENTION

In active steering systems, in particular for the rear axle of motor vehicles, the camber or track of the wheels can be set by way of an actuator so that by controlling the actuator the driving behavior of the motor vehicle can be actively influenced.

DE 39 28 135 A1 discloses a generic wheel suspension for motor vehicles. The wheel carrier of the wheel suspension has a wheel-side support member which pivotally supports the vehicle wheel, and an axle-side support member, between which an actuator is connected as an intermediate element. The actuator is a hydraulic actuating cylinder here which is supported on the one hand on a bearing bracket of the wheel carrier and on the other hand with its piston rod it presses against the external anti-friction bearing race of a wheel bearing, as a result of which the wheel bearing together with the vehicle wheel executes a pivoting motion around a hinge center in order to change the toe-in or toe-out angle or the camber angle of the pertinent vehicle wheel.

The arrangement of the actuator known from DE 39 28 135 A1 between the bearing bracket and the wheel bearing is mechanically complex and takes up a large amount of installation space, with correspondingly high weight. The overall high weight of the wheel suspension is especially disadvantageous since the wheel carrier is an unsprung mass. Moreover, the bearings provided between the support members and the intermediate element in the bearing sites are configured such that they can accommodate not only axial compression forces, but also axial tensile forces and radial forces. Bearings designed in this way have unduly large installation volumes under the limited installation space conditions in the region of the wheel carrier.

The object of the invention consists in making available a wheel suspension with an active steering system which is located in the wheel suspension in a manner which is mechanically simple and favorable to installation space.

SUMMARY OF THE INVENTION

According to the present invention, the wheel suspension has a pretensioning means which presses the wheel-side support member and the axle-side support member with a pretensioning force into contact with one another. The bearing sites in the wheel suspension are exposed only to axial compressive forces and radial forces by the bracing of the two support members. Axial tensile forces are conversely accommodated by the pretensioning means itself. In this way, in the wheel suspension according to the invention simple axial bearings with correspondingly reduced installation space can be used.

It is favorable for mounting technology if the support members and the intermediate element in the direction of action of the pretensioning force are connected to one another in a plug connection without an undercutting structure being necessary for axial fixing of the support members and intermediate elements. The support members and intermediate elements can therefore be easily plugged into one another during assembly. For structural reasons it is preferred if the pretensioning means is connected between the two support members and connects them to one another. The pretensioning means is preferably located radially outside the intermediate element and is functionally decoupled from it.

It is especially preferred if the pretensioning means is designed as a coupling which is connected between the wheel-side support member and the axle-side support member. The coupling as a torque bridge can transfer the torque, for example, a braking moment, from the wheel-side support member to the axle-side support member and thus to the vehicle body. In this way, with the additional coupling a further path of forces and moments, in addition to the intermediate element, is made available via which the braking moment can be reliably transmitted to the vehicle body.

The pretensioning means can preferably be functionally completely decoupled from the intermediate element or actuator or its pivoted parts connected between the support members. In this way neither the pretensioning means nor the actuator is functionally influenced by the respectively other component.

The pretensioning means can preferably be torsionally stiff in order to ensure transmission of torque. Furthermore, the pretensioning means can be made relatively elastic and/or resilient in order to be able to equalize the deflection of the wheel-side support member relative to the axle-side support member.

In this context, the pretensioning means can be a universal joint which is connected between the wheel-side and axle-side support member. For an embodiment with reduced installation space the universal joint can have an articulated part, such as a ring element which is located preferably radially outside the intermediate element and which extends with a radial distance around the intermediate element. Moreover, the universal joint can have bridges which are connected to the support members and which in the form of an articulated fork in turn are articulated to the ring element by way of axes of rotation. In this way, torsionally stiff and play-free torque transmission between the two support members of the wheel carrier takes place by means of a universal joint.

Application of a pretensioning force to the universal joint can take place during installation. To do this, the articulated parts can be coupled to one another under tensile loading.

The intermediate element can be an actuator with a wheel-side pivoted part and an axle-side pivoted part which are mounted between the wheel-side support member and the axle-side support member and are rotatable to one another around their axes of rotation. The wheel-side pivoted part can be deflected relative to the axle-side pivoted part by turning the two pivoted parts by the swivel angle to one another. Accordingly, the vehicle wheel provided on the wheel-side support member therefore is also swiveled by a camber angle or track angle. In contrast to the prior art, therefore the angle of the wheel-side support member is set by rotary actuation of one of the pivoted parts or of the two pivoted parts of the actuator, and not by a linear lifting motion of a hydraulic actuating cylinder which presses against the wheel-side bearing element. The angle can be set by rotary actuation of the two pivoted parts in the same or opposite direction or also by turning one of the two pivoted parts while the other pivoted part does not rotate around its axis.

According to the invention, the wheel-side pivoted part with its middle axle can be moved in the manner of wobbling motion around its axis of rotation. For this purpose, the axis of rotation of the wheel-side pivoted part can be tilted by an angle relative to the axis of rotation of the axle-side pivoted part. In the wobbling motion of the wheel-side pivoted part the two pivoted parts can be in contact, preferably in rolling contact, by way of bearing sites which lie in turn in one plane of rotation. The plane of rotation is aligned perpendicular to the axis of rotation of the wheel-side pivoted part. In this way the wheel-side pivoted part with the pertinent wheel-side support member for the vehicle wheel can move in wobbling motion around its axis of rotation. hi this way the swivel angle between the wheel-side pivoted part and the axle-side pivoted part changes as a function of the angle of rotation of the wheel-side pivoted part.

The three-dimensional alignment of the angle arrangement formed by the two pivoted parts can be changed by rotation of the axle-side pivoted part which takes place simultaneously or offset in time relative to the axle-side support member.

For a design of the wheel suspension which is compact in the transverse direction of the vehicle, the two pivoted parts can be arranged internested into one another. Preferably, one of the two pivoted parts, for example the wheel-side pivoted part, can be designed as a cup-shaped hollow profile part, in which there is an axle-side pivoted part. The bottom of the cup-shaped pivoted part in this case can be designed as a tilted control surface which is in contact with the control surface of the axle-side pivoted part.

In addition, at least one of the support members can be designed as a cup-shaped hollow profile part with a peripheral wall which borders the mounting space in which the actuator according to the invention is located. For stable rotary support the pivoted parts can be supported on the peripheral wall of the cup-shaped support member. In the above described internested arrangement of pivoted parts, only the radially outer pivoted part can be supported on the peripheral wall of the cup-shaped support member.

Preferably, the two pivoted parts can be designed as hollow cylinders. Their cylindrical interior can be used as the installation space for the actuating drives. Alternatively, an articulated shaft for driving the vehicle wheel can be routed through the interior of the pivoted parts.

The arrangement of the actuating drives within the hollow cylindrical pivoted parts is especially preferred when the vehicle wheel is trailed, that is to say, is not driven by an articulated shaft. In this case the cavity of the pivoted parts is empty. Accordingly, actuating drives can be easily located in it.

When using an articulated shaft guided through the cavity of the pivoted parts, it can be necessary, due to the limited installation space, to locate the actuating drives outside the two hollow cylindrical pivoted parts. In this case, on each of the pivoted parts on the outer peripheral side there can be one gearing stage at a time, for example a spur pinion stage. The actuating drives which are propulsively connected to it can be integrated into clear spaces intended for this purpose outside the wheel carrier in a manner favorable to installation space.

This arrangement of the gearing stages and the pertinent actuating drives outside the pivoted parts is, however, a problem with respect to use of metal bellows as a coupling element. The respective gearing stage or the pertinent actuating drive would have to be routed through the metal bellows, as a result of which the serviceability of the metal bellows is reduced. If specifically this routing through of the gearing is integrated into the metal bellows, the torque which can be transmitted by the metal bellows drops due to the planar moment of inertia at this point. The diameter of the metal bellows would have to be greatly increased for equalization.

The aforementioned wheel-side and axle-side bridges of the universal joint with the formation of clear spaces are preferably located angularly offset to one another. At least in part an actuating drive can be located in these clear spaces in a manner favorable to installation space or, alternatively, there can be a gearing stage located on the outside on the pivoted part.

The middle of the universal joint according to one version of the invention lies at the height of the instantaneous center of rotation of the wheel carrier, as a result of which a change in length does not occur when the wheel carrier is adjusted.

Three exemplary embodiments of the invention are described below using the attached figures.

DETAILED DESCRIPTION OF THE PREFERRED EMBODIMENTS OF THE INVENTION

Figure 1:
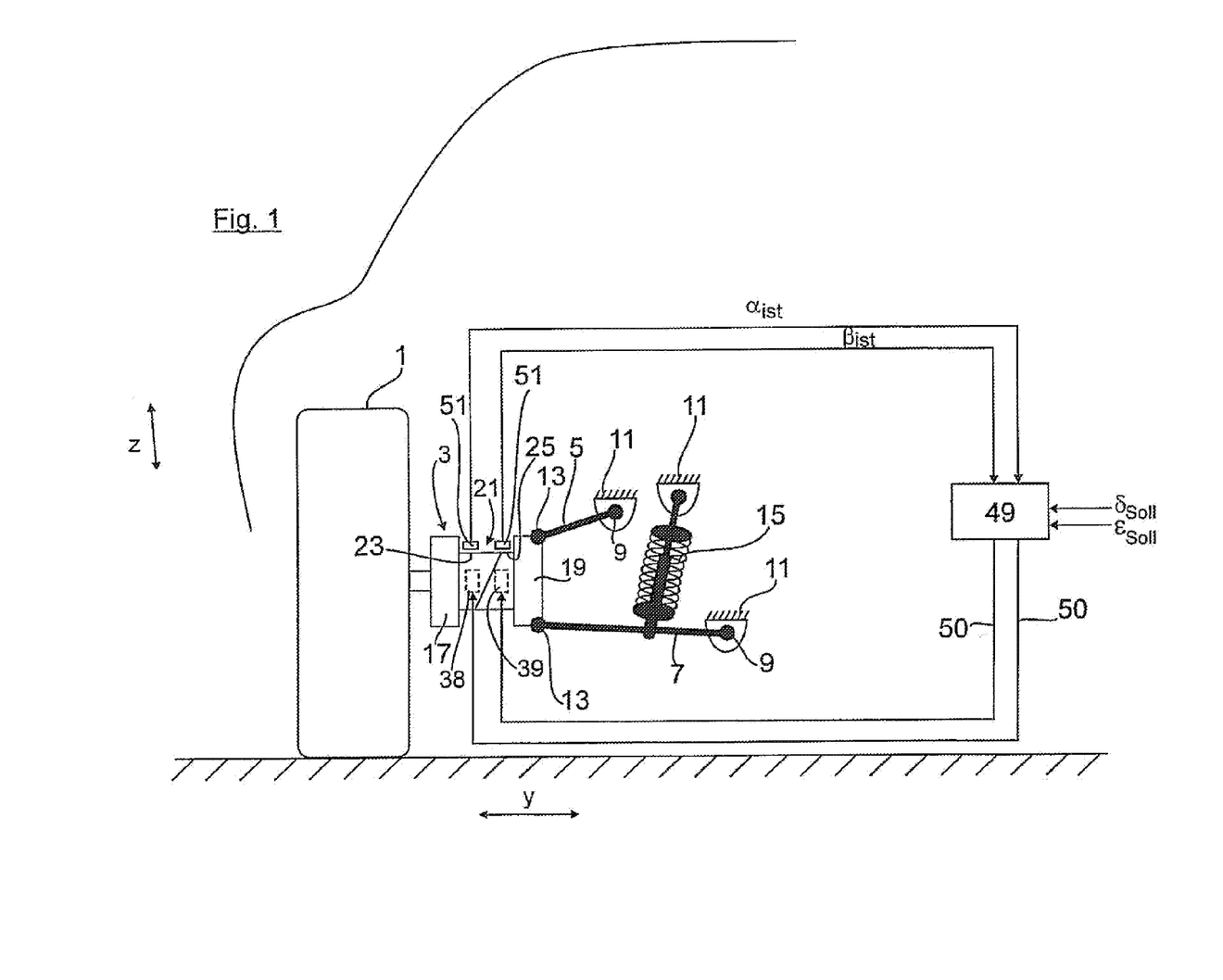
FIG. 1 shows in a schematic a wheel suspension on the rear axle of a vehicle according to the first embodiment.

FIG. 1 shows a wheel suspension in conjunction with a known suspension arm axle in which a wheel carrier 3 which bears the vehicle wheel 1 among other things using an upper suspension arm 5 and a lower suspension arm 7 are pivotally coupled to the vehicle body 11 by way of body-side steering bearings 9. The body-side steering bearings 9 and the wheel carrier-side steering bearings 13 are of conventional design. Between the lower suspension arm 7 and the vehicle body 11 a support spring 15 with an assigned McPherson strut unit is moreover supported in the conventional manner.

In contrast to the illustrated suspension arm axle the wheel carrier 3 can be combined with any axle, for example a rigid axle, a compound steering axle, a multi-steering axle, etc.

As shown in FIG. 1, the wheel carrier 3 has a wheel-side support member 17 and an axle-side support member 19. On the wheel-side support member 17 the vehicle wheel 1 is supported by way of a wheel hub in a wheel bearing of the wheel-side support member 17, which bearing is not shown. Moreover, the brake system can be mounted in the conventional manner on the wheel-side support member 17. The two suspension arms 5, 7 are coupled to the axle-side support member 19 by way of steering bearings 13.

Between the two support members 17, 19 as an intermediate element there is an actuator 21 which has a wheel-side pivoted part 23 and an axle-side pivoted part 25. As follows from FIG. 2, the two pivoted parts 23 and 25 are in contact with one another on their tilted control sides with the interposition of axial bearings 24. There are additional axial bearings 24 between the end side of the pivoted parts 23, 25 and the support members 17, 19, which sides face away from the control sides of the pivoted parts 23, 25.

Figure 2:
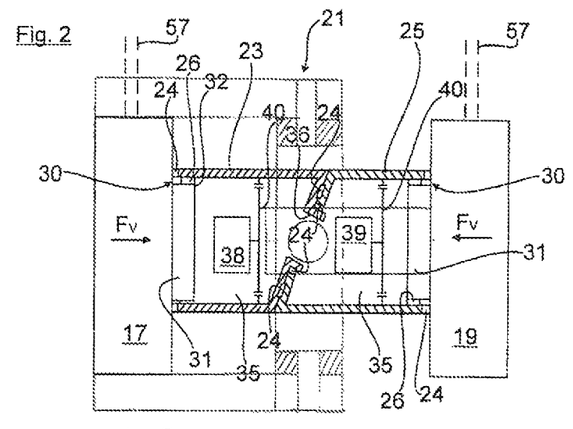
FIG. 2 shows in an enlarged schematic partial sectional view the wheel suspension in isolation.

As further follows from FIG. 2, a central ring flange 36 is molded on the control side of the pivoted part 23. The ring flange 36 projects through a mounting opening in the opposite control side of the axle-side pivoted part 25. Between the ring flange 36 and the opening edge of the axle-side pivoted part 25 there is a radial bearing 26. The pivoted parts 23, 25 are likewise supported on their end sides facing away from the control sides by way of radial bearings 26 on axial projections 31 of the support members 17, 19 which each project into the hollow space of the pivoted parts 23, 25.

Figure 3:
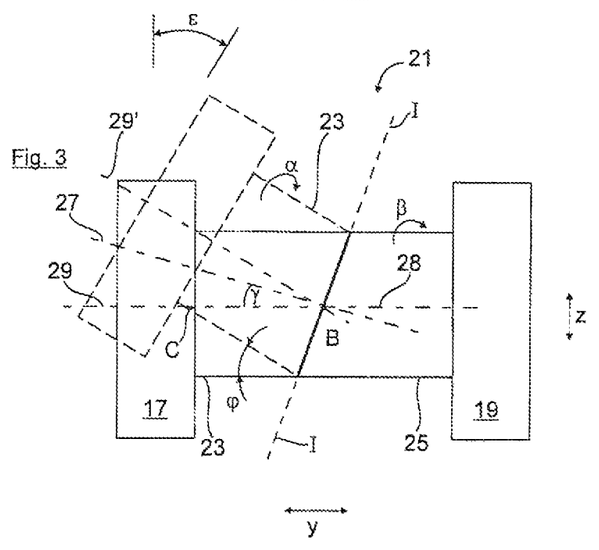
FIG. 3 shows a view of the wheel suspension which illustrates the swiveling motions of the two pivoted parts for setting the track angle or camber angle.

The pivoted parts 23, 25 as shown in FIG. 3 are supported between the two support members 17, 19 to be able to rotate respectively around their axes of rotation 27, 28. The axis 28 of rotation of the pivoted part 25 is axially aligned in the transverse direction of the vehicle y and coaxially to the middle axis 29 of the pivoted part 23. The axis of rotation 27 of the pivoted part 23 is tilted up by an angle of incline $\gamma$. For rotary driving of the pivoted part 23 by an angle $\alpha$ of rotation the pivoted part 23 moves with its middle axis 29 in wobble motion with a variable swivel angle $\phi$ around the axis 27 of rotation.

FIG. 3 shows the pivoted part 23 with the solid line in its initial position at an angle of rotation $\alpha=0$ in which the middle axle 29 of the pivoted part 23 is aligned coaxially to the axis of rotation 28 of the pivoted part 25. In this case, the camber angle $\epsilon$ is 0 in the illustrated yz plane of the vehicle wheel 1.

Moreover, FIG. 3 shows in broken lines the pivoted part 23 by way of example in a rotary position at an angle of rotation $\alpha=180°$. In this rotary position the pivoted part 23 with its middle axle 29' is moved up in wobbling motion around the axis 27 of rotation. This yields a swivel angle $\phi$ between the two pivoted parts 23 and 25. Accordingly, the vehicle wheel 1 or the wheel-side support member 17 is also swiveled around the camber angle $\phi$ in the yz plane.

At the same time, with rotation of the pivoted part 23 or offset in time thereto, the pivoted part 25 can also be turned by an angle $\beta$ of rotation relative to the axle-side support member 19. In this way the pivoted part 23 which is shown in FIG. 3 and which is bent relative to the axle-side pivoted part 25 is swiveled out of the yz plane, by which the track angle $\delta$ of the vehicle wheel 1 can be set. With sole rotation of the pivoted part 23 by an angle of rotation $\alpha$ the pivoted part 23 can swivel out of the yz plane.

Figure 4:
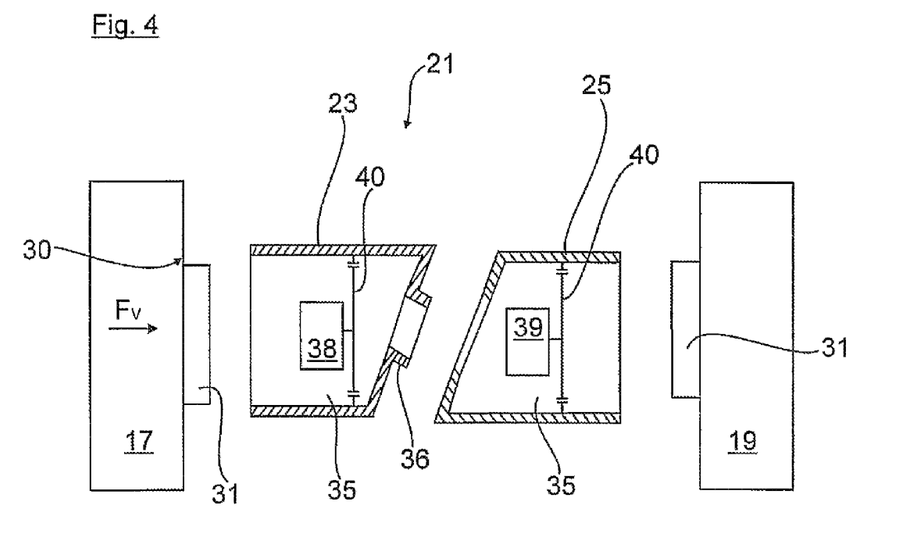
FIG. 4 shows the wheel suspension in an exploded representation.

FIG. 4 shows the wheel suspension of FIG. 2 in an exploded representation in order to illustrate the assembly of the wheel suspension. In mounting, the wheel-side support member 17 with its axle projection 31 is inserted into the open end side of the pivoted part 23 with the interposition of the radial and axial bearings 24, 26 which are not shown here. The ring flange 36 which is provided on the control side of the pivoted part 23 is likewise inserted in the axial direction into the corresponding mounting opening of the pivoted part 25. The support member 19 with its axle projection 31 is inserted into the cavity of the pivoted part 25, likewise with the interposition of radial and axial bearings 24, 26.

The components of the wheel suspension can therefore be easily mounted in terms of mounting technology in a plug-in connection without an undercut which acts in the axial direction being necessary at the connecting sites. For reliable coupling of the components of the wheel suspension in the axial direction there is an additional pretensioning means 57 which is shown in FIG. 2 only by the broken line. The pretensioning means 57 in the axial direction applies a pretensioning force $F_V$ to the support members 17, 19 with the interposed pivoted parts 23, 25.

The pretensioning means 57 is completely decoupled in functional terms from the intermediate member 21 and effects axial fixing of the components of the wheel suspension. Coupling of the support members 17, 19 to the pivoted parts 23, 25 or coupling between the two pivoted parts 23, 25 by a complex undercutting construction is thus avoided.

As a result of the axial fixing of the support members 17, 19 simple axial and radial needle bearing combinations can be used which can be dimensioned to be very small and can accommodate very large forces.

Compared to the structure according to the invention, in an undercut coupling between the support members 17, 19 and the pivoted parts 23, 25 the bearing sites should be designed not only for compressive, but also for tensile loads. Bearings designed in this way are, for example, preloaded bearing pairs in a X or O arrangement with tapered roller bearings. Such double-row bearing combinations due to twice the number of bearings in the direction of installation depth must be dimensioned to be large; this is disadvantageous in view of the limited installation space conditions in the wheel suspension.

In the cavities 35 of the two pivoted parts 23, 25 there are torque motors 38, 39 which mesh with the internal toothing of the respective pivoted part 23 by way of a gear train 40.

For effective track and camber adjustment, according to FIG. 1 the setpoints $\delta_{setpoint}$ and $\epsilon_{setpoint}$ are computed for the track and camber angles by a higher-order control device which is not shown based on different vehicle parameters and are routed to a control means 49. The control means 49 can be triggered by way of signal lines 50 with the torque motors 38, 39 of the two pivoted parts 23, 25 which turn the respective pivoted parts 23, 25 over an angle of rotation $\alpha$ or an angle of rotation $\beta$. As indicated in FIG. 1, phase-angle sensors 51 are assigned to the two pivoted parts 23, 25, detect one actual value $\alpha_{actual}$ and $\beta_{actual}$ of the two pivoted parts 23, 25 at a time and feed them back to the control means 49.

Figure 5:
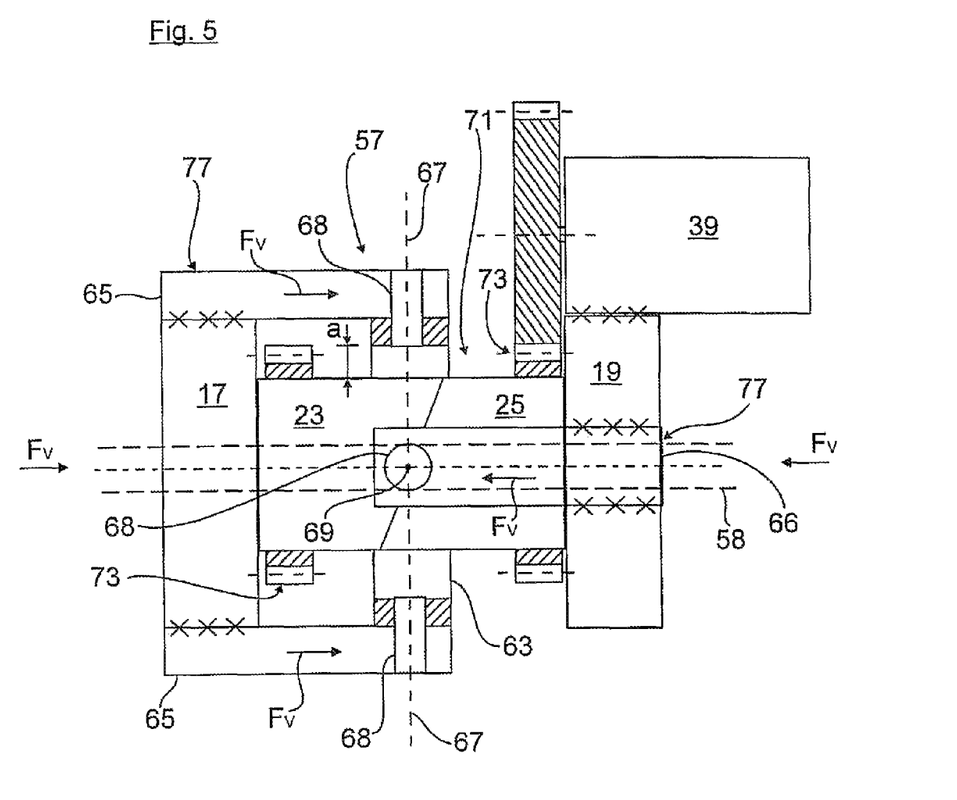
FIG. 5 shows the wheel suspension according to the second embodiment with an integrated universal joint.

In the second embodiment as shown in FIG. 5, the pretensioning means is designed as a universal joint 57 which is connected between the wheel-side support member 17 and the axle-side support member 19.

The embodiment shown in FIG. 5 in fundamental structure matches the preceding embodiment. In this respect, reference is made to its description. In contrast to the preceding embodiments, the vehicle wheel 1 which is held on the wheel-side support member 17 is not trailed, i.e., is not driven by an articulated shaft, but there is additionally an articulated shaft 58 which is shown by the broken line in FIG. 5.

The articulated shaft 58 is routed through the cavities 35 of the two pivoted parts 23, 25 and drives the vehicle wheel 1, as is the case for a rear wheel or all wheel drive. For reasons of space therefore the two actuating drives 38, 39 (in FIG. 5 only the actuating drive 39 is shown) are no longer located within the cavities 35, but outside the cavity 35 of the two pivoted parts 23, 25. The two actuating drives 38, 39 as shown in FIG. 5 are in a toothed connection by way of spur pinion stages 73 which are provided on the outer peripheral side on the pivoted parts 23, 25.

The universal joint 57 here is not only a pretensioning means which presses the support members 17, 19 into contact with one another with a pretensioning force $F_V$. The universal joint 57 acts additionally as a torque bridge via which, for example, a braking moment is transmitted from the wheel-side support member 17 to the axle-side support member 19.

The universal joint 57 as shown in FIG. 5 as the central articulated part has a gimbal 63 which are shown in a half section and which extend radially outside around the pivoted parts 23, 25 and are spaced apart from the pivoted parts 23, 25 over a radial distance a. The gimbal 63 are connected by way of a universal joint fork 77 to the wheel-side support member 17 and to the axle-side support member 19.

The two articulated forks 77 each have wheel-side and axle-side bridges 65, 66. The bridges 65, 66 are on the one hand in a fixed connection to the support members 17, 19 and, on the other hand, by means of the bearing journals 68 which define the axes of rotation 67, 69 which are at a right angle to one another, are coupled to the gimbal 63. The wheel-side and axle-side bridges 65, 66 are angularly offset to one another by an angle of 90° according to FIG. 5, with the formation of clear spaces 71. Into these clear spaces 71 at least in part the gearing stage 73 and/or the respective torque motor 38, 39 can project.

In the assembly of the wheel suspension shown in FIG. 5 the bridges 65, 66 of the universal joint 57 are seated on the bearing journals 68 of the gimbal 63 under tensile loading with their end-side bearing openings. This results in the support members 17, 19 being braced to one another with the pretensioning force $F_V$.

Figure 6:
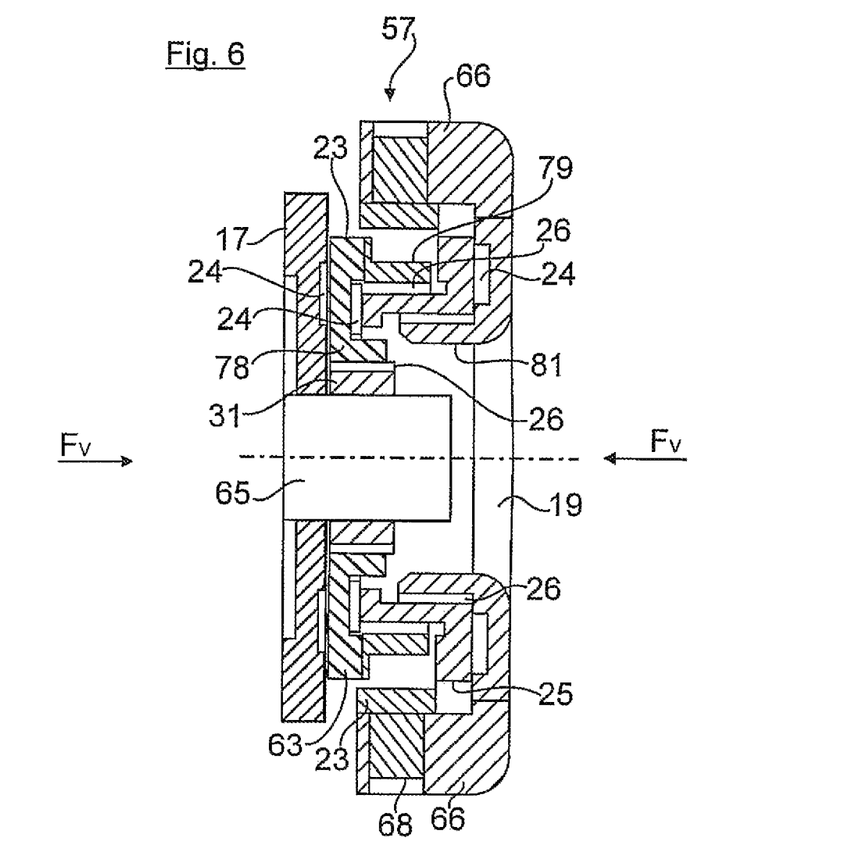
FIG. 6 shows the wheel suspension according to the third embodiment.

FIG. 6 according to the third embodiment shows a technical implementation of the wheel suspension shown in FIG. 5. The structure and the method of operation of the wheel suspensions shown in FIGS. 5 and 6 are essentially the same. Thus the wheel suspension shown in FIG. 6 likewise has two wheel-side and axle-side support members 17, 19. The wheel-side support member 17 is inserted with the central axle projection 31 into the hub section 78 of the wheel-side pivoted part 23. The hub section 78 is spaced radially apart from the cylindrical outside wall 79 of the pivoted part 23 by way of an annular gap. The hollow cylindrical pivoted part 25 whose tilted end side is in contact with the corresponding gap base of the pivoted part 23 by way of the axial needle bearing 24 projects into the annular gap between the cylindrical outside wall 79 and the hub section 78. The pivoted part 25 with its inside periphery sits on a hub section 81 of the axle-side support member 19 with the interposition of a radial needle bearing 26. For smooth adjustment motion of the two pivoted parts 23, 25 other contact surfaces of these pivoted parts 23, 25 are also supported by way of axial and radial needle bearings 24, 26. Since according to FIG. 6 the axial needle bearings 24 are designed only for compressive stress, and not for tensile stress, they can be made with a lower overall height. Due to the reduced overall height, overlapping of individual bearings 24, 26 can take place, as a result of which the axial installation space can be further shortened.

Universal joint bridges 65, 66 each project over the pivoted parts 23, 25 both from the wheel-side support member 17 and also from the axle-side support member 19. The bridges 65, 66, as already mentioned with reference to FIG. 5, are placed under axial pretensioning on the bearing pins 68 of the gimbal 63, as a result of which the support members 17, 19 are pressed into contact with a pretensioning force Fv with interposition of the two pivoted parts 23, 25. The actuating drive for rotary adjustment of the pivoted parts 23, 25 is not shown in FIG. 6. It can, however, be designed analogously to the actuating drive, as is explained with reference to FIG. 5.

The invention claimed is:

1. A wheel suspension for motor vehicles, with at least one wheel-side support member which pivotally supports one vehicle wheel and at least one axle-side support member, between which at least one swivable intermediate means is connected for setting the track angle and/or the camber angle ($\delta$, $\epsilon$) of the vehicle wheel, wherein the wheel-side support member and the axle-side support member arc urged toward one another by a pretensioning means.

2. The wheel suspension according to claim 1 wherein the support members and the intermediate means are connected to one another in the direction of action of a pretensioning force ($F_V$).

3. The wheel suspension according to claim 1 wherein at the bearing sites between the support members and the intermediate means there are axial compression bearings which accommodate a pretensioning force ($F_V$) of the pretensioning means and/or radial bearings.

4. The wheel suspension according to claim 1 wherein the pretensioning means is designed as a coupling which connects the two support members to one another.

5. The wheel suspension according to claim 4 wherein the pretensioning means is designed as a torque bridge with which a torque, can additionally be transmitted from the wheel-side support member to the axle-side support member.

6. The wheel suspension according to claim 1 wherein the pretensioning means is a universal joint which is preferably displaced radially outside the intermediate means.

7. The wheel suspension according to claim 6 wherein the universal joint is a base element, and has wheel-side and axle-side bridges which are connected to the support members and which are articulated to the base element by way of axes of rotation.

8. The wheel suspension according to claim 7 wherein the bridges of the universal joint are coupled to one another on the axes of rotation with the formation of the pretensioning force ($F_V$).

9. The wheel suspension according to claim 7 wherein the wheel-side bridges and the axle-side bridges are angularly offset to one another with the formation of clear spaces.

10. The wheel suspension according claim 1 wherein the intermediate means has a wheel-side pivoted part and an axle-side pivoted part which can be turned around their axes of rotation to one another, and the wheel-side pivoted part can be deflected when the two pivoted parts are turned by the swivel angle ($\phi$) relative to the axle-side pivoted part, by which the track angle and/or camber angle ($\delta$, $\epsilon$) of the vehicle wheel can be set.

11. The wheel suspension according to claim 10 wherein bearing sites are provided between the pivoted parts of the intermediate means and/or the support members.

12. The wheel suspension according to claim 11 wherein the axis of rotation of the wheel-side pivoted part is tilted by an angle of incline ($\gamma$) relative to the axis of rotation of the axle-side pivoted part.

13. The wheel suspension according to claim 10 wherein the wheel-side pivoted part with a middle axle can be rotated in a wobbling motion with a variable swivel angle ($\phi$) around its axis of rotation.

14. The wheel suspension according to claim 10 wherein by turning the wheel-side pivoted part the swivel angle ($\phi$) is set, and by turning the axle-side pivoted part relative to the axle-side support member the three-dimensional alignment of the angle arrangement consisting of the two pivoted parts can be fixed.

15. The wheel suspension according to claim 10 wherein the two pivoted parts are arranged internested in one another in the axial direction, in particular the axle-side pivoted part being located in a cavity of the wheel-side pivoted part.

16. The wheel suspension according to claim 1 wherein the pretensioning means is functionally decoupled from the intermediate means or the pivoted parts, and/or is spaced apart from the intermediate means over a clear distance (a).

17. The wheel suspension according to claim 1 wherein the pretensioning means is torsionally stiff.

18. A wheel suspension assembly for a motor vehicle, comprising;
a wheel support member;
an axle support member;
a first intermediate member rotatably mounted on to said axle support member;

a second intermediate member rotatably mounted on said wheel support member and swivelably connected to said first intermediate member for rotation about an axis displaceable at an angle relative to the axis of rotation of said first intermediate member;

means for selectively swiveling said second intermediate member relative to said first intermediate member; and means interconnecting said intermediate members for maintaining said members together in a pretensioning manner.

19. An assembly according to claim 18 wherein said intermediate members are provided with mating surfaces disposed at an acute angle to the axes of said intermediate members when said axes are in axial alignment.

20. An assembly according to claim 19 including a bearing disposed between said mating surfaces.

21. An assembly according to claim 18 wherein said means for maintaining said members together comprises a universal connection.

\* \* \* \* \*

UNITED STATES PATENT AND TRADEMARK OFFICE
CERTIFICATE OF CORRECTION

PATENT NO.       : 8,459,661 B2                                Page 1 of 1
APPLICATION NO.  : 12/565389
DATED            : June 11, 2013
INVENTOR(S)      : Schmid et al.

It is certified that error appears in the above-identified patent and that said Letters Patent is hereby corrected as shown below:

In the Claims

Col. 7, Lines 59-61, Claim 1 should read - "...wherein the wheel-side support member and the axle-side support member are are urged toward one another by a pretensioning means."

Signed and Sealed this
Twenty-eighth Day of January, 2014

Michelle K. Lee
*Deputy Director of the United States Patent and Trademark Office*